(12) United States Patent
Hiscox (10) Patent No.: US 7,412,797 B1
(45) Date of Patent: Aug. 19, 2008

(54) FREE-STANDING FLYING INSECT TRAP WITH REMOVABLE CARTRIDGE

(76) Inventor: William C. Hiscox, P.O. Box 672, Veradale, WA (US) 99037

( * ) Notice: Subject to any disclaimer, the term of this patent is extended or adjusted under 35 U.S.C. 154(b) by 0 days.

(21) Appl. No.: 11/716,423

(22) Filed: Mar. 9, 2007

Related U.S. Application Data (62) Division of application No. 11/137,983, filed on May 25, 2005, now abandoned.

(60) Provisional application No. 60/574,297, filed on May 25, 2004.

(51) Int. Cl.
   A01M 1/02 (2006.01)
   A01M 1/10 (2006.01)
(52) U.S. Cl. .......................... 43/122; 43/107
(58) Field of Classification Search ................ 43/107, 43/108, 109, 114, 122, 132.1, 133
   See application file for complete search history.

(56) References Cited

U.S. PATENT DOCUMENTS

| | | | |
|---|---|---|---|
| 161,814 A | 4/1875 | Nelson | |
| 722,143 A | 3/1903 | Raymond | |
| 1,139,717 A * | 5/1915 | Pipenhagen | 43/121 |
| 1,221,098 A * | 4/1917 | Shackleford | 43/121 |
| 1,247,724 A | 11/1917 | Sassenhoff | |
| 1,496,135 A * | 6/1924 | Schwiening | 43/118 |
| 1,715,958 A * | 6/1929 | Strand | 43/122 |
| 2,193,492 A * | 3/1940 | Richardson | 43/107 |
| 4,244,135 A | 1/1981 | Harwoods | |
| 4,551,941 A | 11/1985 | Schneidmiller | |
| 4,873,787 A | 10/1989 | Schneidmiller | |
| 5,123,202 A * | 6/1992 | Tanisake | 43/131 |
| 5,231,791 A | 8/1993 | Falkson | |
| 5,231,792 A | 8/1993 | Warner | |
| 5,339,563 A | 8/1994 | Job | |
| 5,392,560 A | 2/1995 | Donahue | |
| 5,522,171 A | 6/1996 | Mandeville | |
| D372,513 S | 8/1996 | Schneidmiller | |
| 5,557,880 A | 9/1996 | Schneidmiller | |
| 5,842,305 A | 12/1998 | Liao | |
| 5,987,809 A | 11/1999 | Cheok | |
| 6,112,452 A | 9/2000 | Campbell | |
| 6,546,667 B1 | 4/2003 | Carter | |
| 6,637,149 B1 | 10/2003 | Bauer | |
| 6,722,080 B2 | 4/2004 | Carter | |
| 6,920,716 B2 * | 7/2005 | Kollars et al. | 43/114 |
| 2003/0138472 A1 * | 7/2003 | Yonker et al. | 424/410 |
| 2003/0167677 A1 | 9/2003 | Carter | |
| 2004/0025412 A1 * | 2/2004 | Simchoni et al. | 43/107 |
| 2004/0128902 A1 | 7/2004 | Kollars | |
| 2005/0279016 A1 | 12/2005 | Williams | |

* cited by examiner

Primary Examiner—Michael R. Mansen
Assistant Examiner—Joshua J Michener
(74) Attorney, Agent, or Firm—Heisler & Associates (57) ABSTRACT

A trap is provided particularly for yellowjacket wasps. The trap includes an outer enclosure with a funnel therein dividing the enclosure into a first chamber and a second chamber. A tip of the funnel has an opening which allows yellowjackets to pass from the first chamber to a second chamber, where the yellowjackets become trapped. The enclosure includes legs which allow the trap to rest upon an underlying surface. Entry holes extend into the first chamber. These entry holes are at least partially visible from a side of the trap. A top cap preferably forms a portion of the second chamber and can be removably replaced so that trapped yellowjackets can be dumped and the trap reused. An attractant is provided within a cartridge which is removably attached through a port in the enclosure, so that the cartridge can be replaced when original attractant is depleted.

1 Claim, 4 Drawing Sheets

FREE-STANDING FLYING INSECT TRAP WITH REMOVABLE CARTRIDGE

CROSS-REFERENCE TO RELATED APPLICATIONS

This application is a divisional of U.S. patent application Ser. No. 11/137, 983, filed on May 25, 2005 now abandoned. This application claims benefit under Title 35, United States Code § 119(e) of U.S. Provisional Application No. 60/574, 297 filed on May 25, 2004.

FIELD OF THE INVENTION

The following invention relates to traps for catching pests, and particularly flying insects. More particularly, this invention relates to traps for catching flying insects which rely on having an outer enclosure with a funnel inside the enclosure which encourages certain flying insects, such as yellowjacket wasps, to migrate from an interior side of the funnel to an exterior side of the funnel and become trapped on the exterior side of the funnel after passing through an open tip of the funnel.

BACKGROUND OF THE INVENTION

Traps for yellowjacket wasps (*Vespula* species), are numerous. They take many shapes and configurations, but generally require an attractant within the trap to attract insects toward openings through which the insects enter. Insects become trapped within the devices and die by either drowning (in a water-filled trap) or by dehydration and starvation (in a non-water filled trap). The present invention is of the latter type.

A tube-shaped yellowjacket trap has been disclosed in U.S. Pat. No. 4,551,941 by Schneidmiller. The Schneidmiller trap is a cylindrical tube with two end caps. The top end cap is a perforated screen which allows air into the trap. The lower cap contains an attractant cup and entrance structure, through which insects pass to enter the trap. Once inside the lower section of the trap, insects seek escape through an inverted, perforated cone having a smaller opening toward the top of the trap. The insects move toward light entering the top and sides of the trap. Once insects have passed through the smaller aperture of the inverted cone, they become trapped in the uppermost section of the trap and later die of dehydration or starvation.

An improved, tube-shaped trap has more recently been disclosed by Schneidmiller in U.S. Pat. Nos. 5,557,880 and D372,513. The trap consists of a cylindrical tube having a closed upper end and an open lower end. The closed upper end of the tube has slots arranged radially around the top for airflow. A truncated cone with two open ends is arranged within the cylinder, such that the end having a smaller opening projects into the uppermost interior portion of the cylinder. The other end of the cone has a larger opening fitting against the inner circumference of the wall of the cylinder approximately at the open end of the cylinder; and a cap which attaches threadably to the open end of the cylinder, and which holds the cone in place within the cylinder.

A lure is placed in the cup. Airflow through the trap allows attractant to be dispersed, so that it may come into contact with the wasps in the vicinity of the trap, which are then lured into the trap through small holes in the bottom of the cap. Once inside the lower section of the trap, insects perceive the open top end of the inner cone as an escape route, since light projects from the outside of the trap and the top of the trap into the interior of the trap, and through the inner cone. Thus, insects move through the smaller hole at the top of the cone into the upper section of the trap, where they die of dehydration and/or starvation. Insects are removed by unscrewing the cap, removing the inner cone and pouring out the insect carcasses.

The Schneidmiller trap has several drawbacks. First, it cannot be placed on a table or other level surface. Also, this design does not allow for entry of insects from the side of the trap. Yellowjackets normally approach the trap from the sides, and have trouble finding their way into the trap. A significant percentage of insects approaching the trap cannot find the entrance into the trap to reach the attractant. The improved Schneidmiller trap is designed for better airflow through various holes in the sides and top of the trap. However, airflow through the trap directs attractant to these airflow holes and not specifically to the entrance holes, thus confusing the insects. Additionally, it is very difficult to empty the trap of dead insects, requiring that the user completely disassemble the trap in order to empty the upper chamber. The inner cone through which insects move into the upper chamber must be removed from the body of the trap to allow removal of insects. This is a clumsy operation and can result in wasp stings to the user, should there be live wasps remaining in the trap.

The present invention overcomes these problems and results in a far more effective trap, especially for yellowjacket wasps.

SUMMARY OF THE INVENTION

With this invention a trap is provided for pests, and particularly flying insects. The trap generally includes an outer enclosure preferably formed by a combination of a base, a middle tube and a top cap. A funnel is located within the enclosure. This funnel divides the interior of the enclosure into a first chamber on an inner side of the funnel and a second chamber on an outer side of the funnel. The funnel includes an opening at a tip of the funnel through which the pests, and particularly yellowjacket wasps or other flying insects, can pass. An interesting principle upon which this invention is based is that such flying insects will readily climb up the inner side of the funnel up to the opening and pass through the opening from the first chamber to the second chamber within the enclosure. However, once within the second chamber on the outer side of the funnel and within the enclosure, it is difficult for the pests, and particularly yellowjackets, to find this opening and pass back through this opening. Hence, the yellowjackets or other pests remain within the second chamber on the outer side of the funnel and within the enclosure where they typically dehydrate and die.

The enclosure is provided with entry holes which allow the flying insects or other pests to pass into the first chamber of the enclosure on the inner side of the funnel. These entry holes are preferably oriented so that they can be seen by a flying insect or other pest viewing the trap from the side. It has been discovered that many pests, particularly flying insects, do much of their navigation visually and have a preference for approaching an object such as the trap from a lateral direction. Hence, providing the entry holes at least partially visible from a lateral side of the trap increases the probability that the pests, and particularly flying insects such as yellowjackets, to find the entry holes and pass into the first chamber of the enclosure.

Most preferably, the trap of this invention is configured so that it can be used repeatedly for a long period of time. When the trap becomes full it can be emptied. In particular, the top cap is preferably formed to be removable from other portions of the outer enclosure. This top cap is adjacent the second chamber on the outer side of the funnel where the trapped and typically dead yellowjackets or other pests have collected. The top cap can merely be removed and the carcasses disposed of. The top cap can then be replaced and the trap is again ready to collect additional pests.

Most preferably, an attractant is provided which disperses into the air and has an aroma which is attractive to the pests to be trapped. This attractant is placed into the interior of the outer enclosure so that the aroma of the attractant passes through the entry holes to draw the pests through the entry holes and into the trap. Most preferably, the attractant is provided within a cartridge which is removably attachable to a portion of the enclosure of the trap. In this way, when the attractant has become depleted, the attractant cartridge can be removed and a new attractant cartridge provided in its place (or the original cartridge refilled) so that the ability of the trap to attract insects is maintained.

Most preferably, the cartridge is configured to be replaceably received through a port in the base of the trap. The cartridge is preferably provided with a upper shell which has fenestrations therein allowing the aroma of the attractant to pass out of the cartridge, but which upper shell prevents the pests from coming into direct contact with the attractant. Most preferably, a removable cap is provided over the upper shell and covering the attractant within a reservoir in the cartridge. This cap keeps the attractant fresh until the cartridge is ready for use. The cap is then removed right before the cartridge is placed into the port in the trap and the attractant aroma disperses in the air and out of the entry holes to the environment surrounding the trap.

The trap is preferably provided with legs which allow the trap to rest upon an underlying generally horizontal surface. The trap can also optionally include an eyelet at an upper end of the trap so that the trap can alternatively be suspended from above. In a preferred embodiment, the legs are provided generally in the form of fins and the enclosure and fins together have a form generally similar to that of a rocket. In this way, the entire trap has the attractive and interesting appearance of a rocket, making it more desirable for users to display the trap without conveying the immediate message to visitors that pests might be present.

OBJECTS OF THE INVENTION

Accordingly, a primary object of the present invention is to provide a trap for capturing flying insects, and particularly yellowjacket wasps.

Another object of the present invention is to provide a trap for pests which can either rest upon a substantially horizontal surface or be suspended down from an overlying support.

Another object of the present invention is to provide a trap for pests which has an attractant to draw the pests to the trap, and which additionally is capable of being recharged with fresh attractant when original attractant becomes depleted.

Another object of the present invention is to provide a trap for flying insects which can be emptied and reused when full.

Another object of the present invention is to provide a pest trap which has an attractive appearance generally in the form of a rocket.

Another object of the present invention is to provide a trap for flying insects which is highly effective in drawing the flying insects to the trap and highly effective in trapping the insects therein.

Another object of the present invention is to provide a trap for flying insects which exhibits an extended life beyond a period for which an attractant material remains active and beyond a period it takes for the trap to fill up with trapped pests.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 is directed to a trap for capturing pests, and particularly configured to capture yellowjacket wasps Y or other flying insects. The trap 10 is configured to draw the yellowjackets Y or other pests into the trap 10 and hold the yellowjackets Y or other pests therein until they die, typically from dehydration. The trap 10 is configured so that trapped yellowjackets Y can be removed, such as when the trap 10 is full, so that the trap 10 can continue to be used. The trap 10 preferably utilizes an attractant A to draw the yellowjackets Y into the trap 10. This attractant A is preferably provided within a removable cartridge 80, so that when the attractant A is depleted, a new cartridge 80 can be substituted for the original cartridge 80 so that the attractant A is refreshed and the trap 10 is renewed to capture additional yellowjackets Y.

Figure 1:
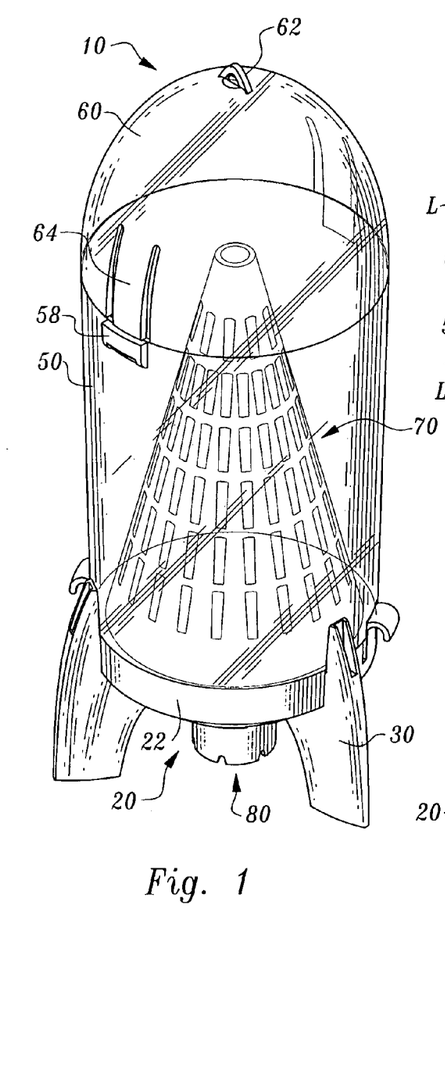
FIG. 1 is a perspective view of the trap of this invention according to a preferred embodiment. Because portions of an outer enclosure of the trap are preferably formed of transparent material, interior features of the trap are also generally seen in FIG. 1.
Figure 2:
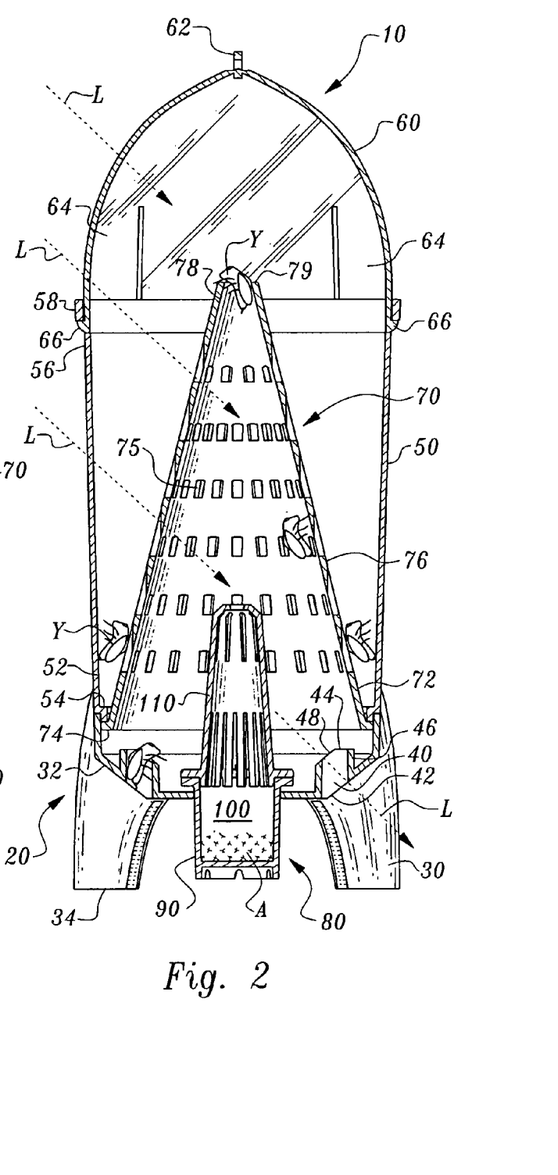
FIG. 2 is a full sectional view of that which is shown in FIG. 1, with the section taken along line 2-2 of FIG. 6.
Figure 3:
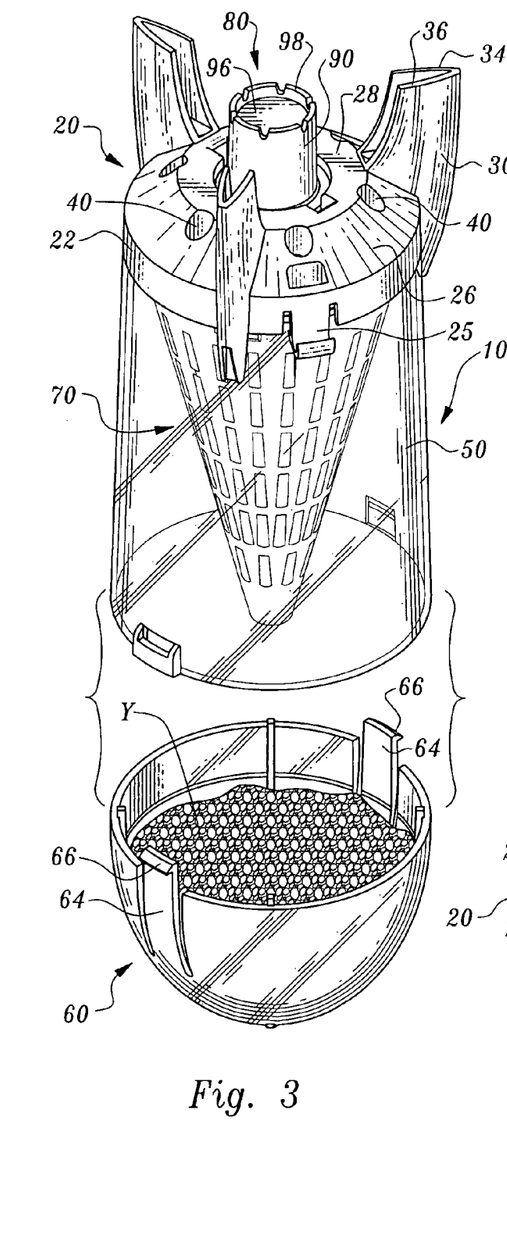
FIG. 3 is a perspective view of that which is shown in FIG. 1 with the trap inverted and the top cap removed for disposal of trapped yellowjacket carcasses.

In essence, and with particular reference to FIG. 2, the basic details of the trap 10 of this invention, according to a preferred embodiment, are described. The trap 10 includes an outer enclosure which is preferably formed of a base 20, a middle tube 50 and a top cap 60. The base 20 is preferably provided with legs 30 to allow the base 20 to optionally rest upon a substantially horizontal surface. Alternatively, the trap 10 can be suspended from above with the legs 30 remaining for decorative purposes or omitted. Entry holes 40 are provided which pass through the wall of the outer enclosure. Most preferably, these entry holes 40 are located within the base 20 and are oriented to be at least partially visible from the side of the trap 10.

The middle tube 50 is preferably substantially cylindrical and extends up from the base 20 to the top cap 60. The top cap 60 encloses an upper portion of the outer enclosure of the trap 10. This top cap 60 is preferably removably attached to the middle tube 50, so that trapped insects, such as yellowjackets Y, can be removed from the trap 10 when desired.

A funnel 70 is oriented within the outer enclosure. The funnel 70 is oriented with an inner side of the funnel 70 facing downward toward the base 20 and an outer side of the funnel 70 facing upward toward the top cap 60. The funnel 70 divides the interior of the outer enclosure into a first chamber below the funnel 70 and a second chamber above the funnel 70. An opening 79 passes through a tip 78 of the funnel 70 to allow yellowjackets Y to pass from the first chamber up to the second chamber, for trapping within the second chamber. The funnel 70 has a sufficient diameter at its lower end to completely divide the first chamber below the funnel 70 from the second chamber above the funnel 70, except through the opening 79.

A cartridge 80 is preferably provided which is removably attachable to the trap 10. Most preferably, the base 20 of the trap 10 is provided with a port 82 (FIG. 10) into which the cartridge 80 can be removably attached. The cartridge 80 can thus be removed and replaced when an attractant A (FIG. 8) within the cartridge 80 benefits from being refreshed. The cartridge 80 includes a body 90 which contains a reservoir 100 for the attractant A. A upper shell 110 preferably extends over the reservoir 100 and above the body 90. The upper shell 110 allows aroma of the attractant A to pass out of the cartridge 80, while keeping the yellowjackets Y from coming into contact with the attractant A. A cap 120 (FIGS. 7-9) is preferably provided which overlies the upper shell 110 and seals the attractant A within the cartridge 80 without escape, until the cap 120 is removed for use of the cartridge 80 within the trap 10.

Figures 5, 6, 10:
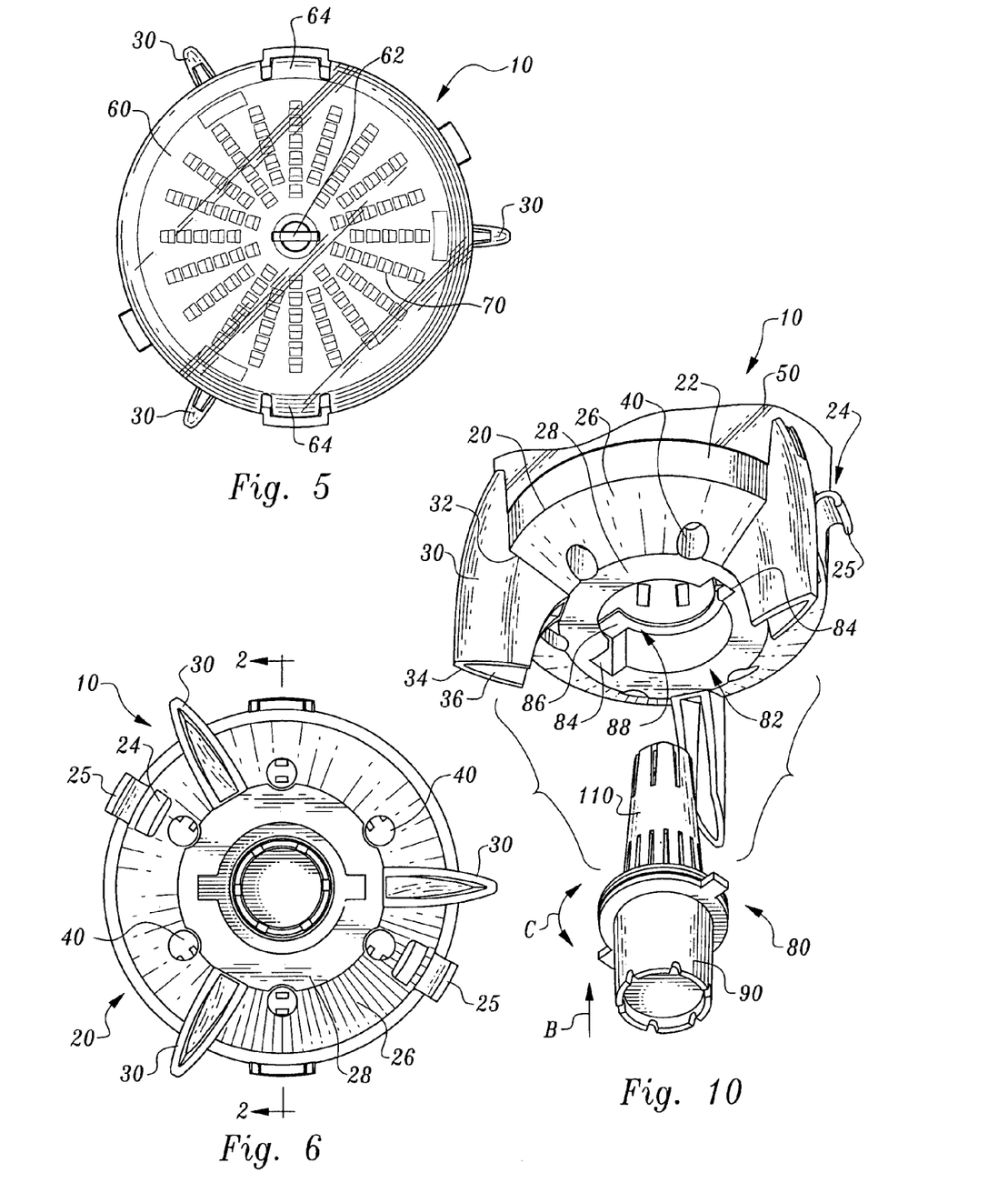
FIG. 5 is a top plan view of that which is shown in FIG. 1.
FIG. 6 is a bottom plan view of that which is shown in FIG. 1.
FIG. 10 is a perspective view of the cartridge and a lower portion of the enclosure illustrating how the cartridge is inserted into the enclosure for use within the trap.

More specifically, and with particular reference to FIGS. 6 and 10, details of the base 20 are described, according to a preferred embodiment. The base 20 preferably provides a lower portion of the outer enclosure of the trap 10. The base 20 is preferably a substantially rigid construct formed from a unitary mass of material, such as a plastic material forming the base 20 through an injection molding manufacturing process. The base 20 preferably includes a generally cylindrical side wall 22 at an upper portion of the base 20. A beveled wall 26 tapers conically from the side wall 22 down to a bottom wall 28. The bottom wall 28 is preferably substantially circular and flat, facing downwardly and forming a lowermost portion of the base 20.

Most preferably, the base 20 is configured to be removably attachable to the middle tube 50. In particular, clasps 24 are preferably provided extending up from the side wall 22 of the base 20. A release 25, preferably in the form of a hook, is coupled to each of the clasps 24. The clasps 24 preferably snap into slits in the middle tube 50 near a lower edge 52 thereof, so that the middle tube 50 is captured adjacent and above the base 20. The release 25 provides a grip by which a user can exert outward pressure to disengage the clasps 24 and allow the base 20 to be removed from the middle tube 50. In this way, the base 20 and middle tube 50 can be separated from each other, such as for cleaning and maintenance of the trap 10. Beneficially, this removal of the base 20 from the middle tube 50 is not required for the performance of the trap 10. Rather, such openability between the base 20 and middle tube 50 allows for enhanced servicing of the trap 10, if required.

While the base 20 is preferably formed separately from the middle tube 50, the base 20 could alternatively be formed along with the middle tube 50 so that the base 20 and middle tube 50 are not separable from each other. The base 20 could have other geometric configurations and still provide the general function of enclosing the lower portion of the outer enclosure of the trap 10.

With particular reference to FIGS. 1-6, particular details of the legs 30 of the trap 10 are described, according to a preferred embodiment. The trap 10 preferably includes legs 30 extending downwardly and somewhat outwardly from the base 20. The legs 30 are optional, but beneficially allow the trap 10 to rest in a stable fashion upon an underlying surface. Most preferably, three legs 30 are provided with each of the legs spaced 120° from each other for equal spacing and most beneficial support of the trap 10 upon an underlying horizontal surface. Alternatively, a greater or lesser number of legs 30 could be provided. It is also conceivable that no legs 30 could be provided, and that the trap 10 could merely rest upon the cartridge 80 or some other support structure. The trap 10 can also be configured with no structures for supporting the trap 10 upon an underlying horizontal surface, so that the trap 10 requires suspension from above or for other support of the trap 10 to be arranged.

With the legs 30 according to the preferred embodiment, each of the legs 30 extends from a saddle 32 adjacent the base 20 to a foot 34 opposite the saddle 32. Most preferably, a core 36 of each of the legs 30 is hollow, to minimize a weight of the trap 10 and maximize strength of the legs 30 by concentrating material at a periphery of each of the legs 30.

The legs 30 can take on various different appearances, with the most preferable appearance being generally in the form of fins such as those that might extend from lower lateral edges of a rocket. Such a configuration for the legs 30 causes the overall trap 10 to have the general appearance of a rocket with the legs 30 appearing as fins of the rocket and allowing the trap 10 to rest upon an underlying horizontal surface in a manner similar to how a rocket would appear when ready for launch. Preferably, the legs 30 are formed with the base 20, but the legs 30 could alternatively be formed separately and attached to the base 20, or to the middle tube 50, or to both the base 20 and middle tube 50, or other portions of the trap 10. The legs 30 preferably extend primarily downwardly from the base 20, but also extend somewhat radially away from a vertical centerline of the base 20. In this way, a stability of the trap 10 when resting upon the legs 30 is enhanced.

Figure 4:
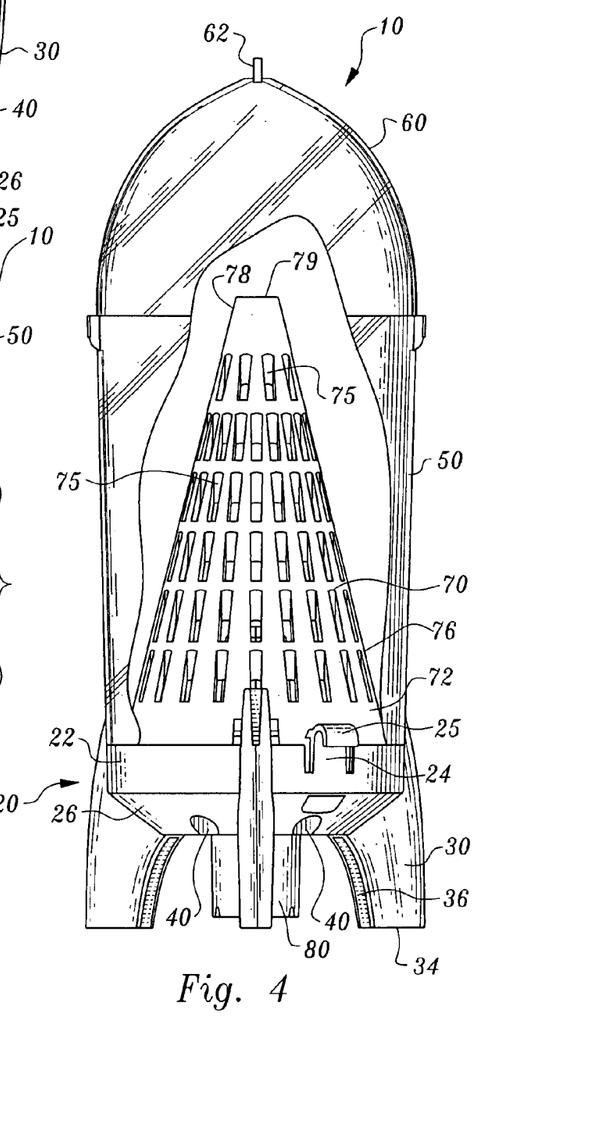
FIG. 4 is a front elevation view of the trap of FIG. 1 with portions of the top cap and middle tube forming the outer enclosure cut away to reveal interior details of the trap.

With particular reference to FIGS. 2, 4 and 10, details of the entry holes 40 are described, according to a preferred embodiment. The entry holes 40 are preferably located within the base 20 and allow the yellowjackets Y or other flying insects to pass through the wall of the outer enclosure of the trap 10 into the first chamber on an inner side of the funnel 70. The base 20 is preferably opaque. However, these entry holes 40 also allow light to pass through the base 40, so that ambient light around the trap 10 can pass through the outer enclosure (which is preferably at least partially transparent) and light L (FIG. 2) can pass out through the entry holes 40 somewhat. In this way, the yellowjackets Y, being attracted to light, will clearly see the lighted entry holes 40 against the contrasting opaque base 20 and recognize that the entry holes 40 are passages which lead somewhere. The yellowjackets Y are thus enticed to pass through the entry holes 40.

Each of the entry holes 40 preferably has a particular configuration to discourage the yellowjackets from passing back out through the entry holes 40 and to provide a convenient surface upon which the yellowjackets Y can climb while passing through the entry holes 40. In particular, the entry holes 40 preferably include an entrance end 42 where the yellowjackets Y first enter the entry holes 40 and an exit end 44 opposite the entry end 42 and within the first chamber inside the outer enclosure of the trap 10.

A tunnel 46 extends between the entrance end 42 and the exit end 44. This tunnel 46 is preferably substantially cylindrical in form. The tunnel 46 could have various different orientations, but most preferably has a centerline extending vertically. Most preferably, the exit end 44 has an at least partially slanted edge 48 thereon. Thus, the exit end 44 preferably includes a substantially horizontal portion and a slanted edge 48. By providing the slanted edge 48, a greater amount of light is allowed to pass out of the entry holes 40. Experience has shown that providing such a slanted edge 48 significantly increases the visibility of the entrance holes 40 to the yellowjackets Y, and significantly increases the desirability on behalf of the yellowjackets Y, to pass through the entry holes 40.

The entry holes 40 provide a path for yellowjackets Y to pass into the first chamber of the outer enclosure on the inner side of the funnel 70. Most preferably, these entry holes 40 are located within the base 20 of the trap 10. Alternatively, the entry holes 40 could be provided in a lower portion of the middle tube 50, or in other portions of the outer enclosure of the trap 10, provided that the entry holes 40 allow access into an interior of the outer enclosure, and particularly the first chamber within the outer enclosure.

Most preferably, the entry holes 40 are located adjacent a transition between the beveled wall 26 and bottom wall 28 of the base 20. In this way, the entry holes 40 are visible laterally away from the trap 10 so that the yellowjackets Y can readily see the entry holes 40 when approaching the trap 10 from the lateral side. Preferably, multiple entry holes 40 (such as six) are provided with the entry holes 40 equally spaced from each other and spaced approximately midway between a centerline of the trap 10 and a peripheral edge of the trap 10 (FIG. 6).

With particular reference to FIGS. 1-4, details of the middle tube 50 of the trap 10 are described, according to a preferred embodiment. The middle tube 50 is preferably a generally cylindrical hollow structure with a diameter similar to that of the sidewall 22 of the base 20. The middle tube 50 extends from a lower edge 52 up to an upper edge 56. A ledge 54 adjacent the lower edge 52 is spaced slightly above the base 20 and allows a portion of the funnel 70 to be attached to the middle tube 50, or at least be trapped between this ledge 54 of the middle tube 50 and the base 20, so that when the middle tube 50 is secured to the base 20, with the funnel 70 also secured in place. Most preferably, the funnel 70 is attached securely to the middle tube 50, either reversibly or irreversibly, to make a close fit against the middle tube 50. The funnel 70 may also optionally be molded in one piece with the middle tube 50.

The middle tube 50 includes receivers 58 adjacent the upper edge 56, which allow the top cap 60 to be removably secured to the middle tube 50. The middle tube 50 is preferably at least partially transparent, so that light L can pass into an interior of the outer enclosure of the trap 10 and make the space within the trap 10 desirable for light seeking insects, such as yellowjackets Y to enter and remain.

With particular reference to FIGS. 1-5, details of the top cap 60 of the trap 10 are described, according to a preferred embodiment. The top cap 60 is preferably a rigid semi-spherical structure formed from a unitary mass of material, such as a plastic injection moldable material. The top cap 60 preferably includes an eyelet 62 at an uppermost portion thereof to facilitate suspension of the trap 10 from above, such as with a string coupled to a tree branch or other overlying structure. The top cap 60 has a hollow interior which can receive yellowjackets Y (FIG. 3), such as before disposal.

The top cap 60 preferably includes a pair of fingers 64 which each include a tooth 66 at a tip thereof. The fingers 64 with teeth 66 engage the receivers 58 on the middle tube 50 to allow the top cap 60 to flex and removably be secured to the upper edge 56 of the middle tube 50 (FIG. 2). Other fasteners could alternatively be provided to establish some form of a means to removably attach the top cap 60 or other operable portion of the trap 10 outer enclosure to other portions of the enclosure.

Preferably, the top cap 60 has a volume similar to a volume on an exterior of the funnel 70 and within the middle tube 50. In this way, when the second chamber within the outer enclosure of the trap 10 is full of yellowjackets Y, and these yellowjackets Y are dead, the top cap 60 can be removed while the trap 10 is inverted, and the yellowjackets Y can reside within the top cap 60 before being dumped at an appropriate disposal site. The top cap 60 can then be reattached to the middle tube 50 and the trap 10 is ready for continued use.

While the top cap 60 provides a preferred form of opening for emptying of yellowjackets Y out of the outer enclosure of the trap 10, other openings could be provided, with the top cap 60 optionally affixed to the middle tube 50 or other portions of the outer enclosure in a more permanent fashion. The top cap 60 is preferably formed so that it is generally similar in appearance to a nose cone of a rocket. Thus, the top cap 60, middle tube 50, base 20 and legs 30 act together to give the trap 10 an overall appearance similar to that of a rocket.

With particular reference to FIGS. 1-4, details of the funnel 70 are described, according to a preferred embodiment. The funnel 70 is preferably a rigid structure formed of an injection moldable material, such as a plastic. The funnel 70 is preferably partially transparent and additionally includes apertures 75 therein, so that a large amount of light is allowed to pass through the funnel 70. These apertures 75 are sufficiently small that yellowjackets Y cannot pass through these apertures.

The funnel 70 includes a lower end 72 forming a greatest diameter of the funnel 70. The lower end 72 includes a flange 74 thereon which resides below the ledge 54 of the middle tube 50, and is preferably attached to the ledge 54, or at least so that the lower end 72 of the funnel 70 is captured between the base 20 and middle tube 50. The funnel 70 includes a tapering side wall 76 extending from the larger diameter lower end 72 to the tip 78. The tip 78 includes the opening 79. The opening 79 is sized sufficiently to allow the yellowjackets Y to pass from the first chamber on the inner side of the funnel 70 to the second chamber on the outer side of the funnel 70.

The funnel 70 preferably tapers at a constant angle from the lower end 72 up to the tip 78. Alternatively, the funnel 70 could taper in a curving fashion or in some irregular fashion, such as with the funnel 70 more dome-like in form, and still function adequately according to this invention. At a minimum, the funnel 70 adjacent the opening 79 and the tip 78 preferably is sufficiently tapered so that it is easier for the yellowjackets Y to pass from the inner side of the funnel 70 through the opening 79 than from the outer side of the funnel 70 through the opening 79. This characteristic of the funnel 70 causes the yellowjackets Y to collect within the second chamber on the outer side of the funnel 70 and allows yellowjackets Y to continue to migrate through the opening 79 to become captured within the trap 10.

With particular reference to FIGS. 7-10, details of the cartridge 80 for support of the attractant A are described. The cartridge 80 provides a preferred structure for support of an attractant A. While the trap 10 could conceivably be utilized without an attractant, and still effectively trap yellowjackets Y to some extent, most preferably an attractant A is provided. This attractant A could be in the form of a light, or in the form of some form of material which forms attractive smelling vapor in the air which is dispersed out of the cartridge 80 and away from the trap 10 so that the yellowjackets Y are attracted to the trap 10. Such attractant materials could be in the form of materials having an aroma similar to that which is a food for the yellowjackets Y or which provides a pheromone which is otherwise attractive to the yellowjackets Y.

The cartridge 80 is preferably removably attachable to the trap 10 so that the attractant A can be recharged by replacing the cartridge 80 when the attractant A becomes depleted. In particular, the base 20 of the trap 10 (FIG. 10) preferably includes a port 82 passing therethrough within the bottom wall 28 of the base 20. This port 82 is sized sufficiently wide to allow the cartridge 80 to pass vertically up into the port 80 (arrow B of FIG. 10). Preferably, the port 82 includes a pair of slots 84 defining wider portions of the port 82. A stop plate 86 is optionally provided inboard of the port 82, with a groove 88 between the stop plate 86 and the bottom wall 28 of the base 20 adjacent the port 82. This configuration around the port 82 facilitates removable attachment of the cartridge 80 according to the preferred embodiment, as described in detail below. The port 82 can optionally be located anywhere on the outer enclosure, either accessing the first chamber or the second chamber (or both).

The cartridge 80 preferably includes a body 90 which contains a reservoir 100 for the attractant A. A upper shell 110 is preferably provided overlying the reservoir 100 within the body 90. The body 90 includes a lip 92 extending radially from a rim of the reservoir 100. Preferably, a pair of tabs 94 extend radially from the lip 92 to define portions of the lip 92 which extend further radially from a centerline of the body 90 than other portions of the lip 92. The lip 92 is sized to pass through the port 82 and the base 20 of the trap 10. The tabs 94 are sized to not pass through the port 82 unless they are aligned with the slots 84 in the port 82. The tabs 94 have a sufficiently minimal depth that they can fit between the stop plate 86 and the bottom wall 28 of the base 20 and pass within the groove 88. In this way, the cartridge 80 can be rotated (about arrow C of FIG. 10) after the cartridge 80 has been inserted, so that the tabs 94 pass into the groove 88 and hold the cartridge 80 in place within the port 82 and the base 20.

Alternatively, the port 82 can be threaded and the cartridge 80 fitted with complemental threads. Other fasteners could also be utilized, including clips, clasps, hooks, hook and loop fabric fasteners, adhesives, magnets, snaps or other fasteners. The body 90 additionally preferably includes a floor 96 defining a bottom of the reservoir 100 and lower extensions 98 which extend further from the floor 96 of the body 90. In an alternative embodiment of the invention, these lower extensions 98 can act as a means to support the trap 10 upon an underlying support surface. Most preferably, however, these lower extensions 98 do not extend down as far as the legs 30, so that the entire cartridge 80 is suspended above a support surface upon which the legs 30 of the trap 10 rest.

Figures 7, 8, 9:
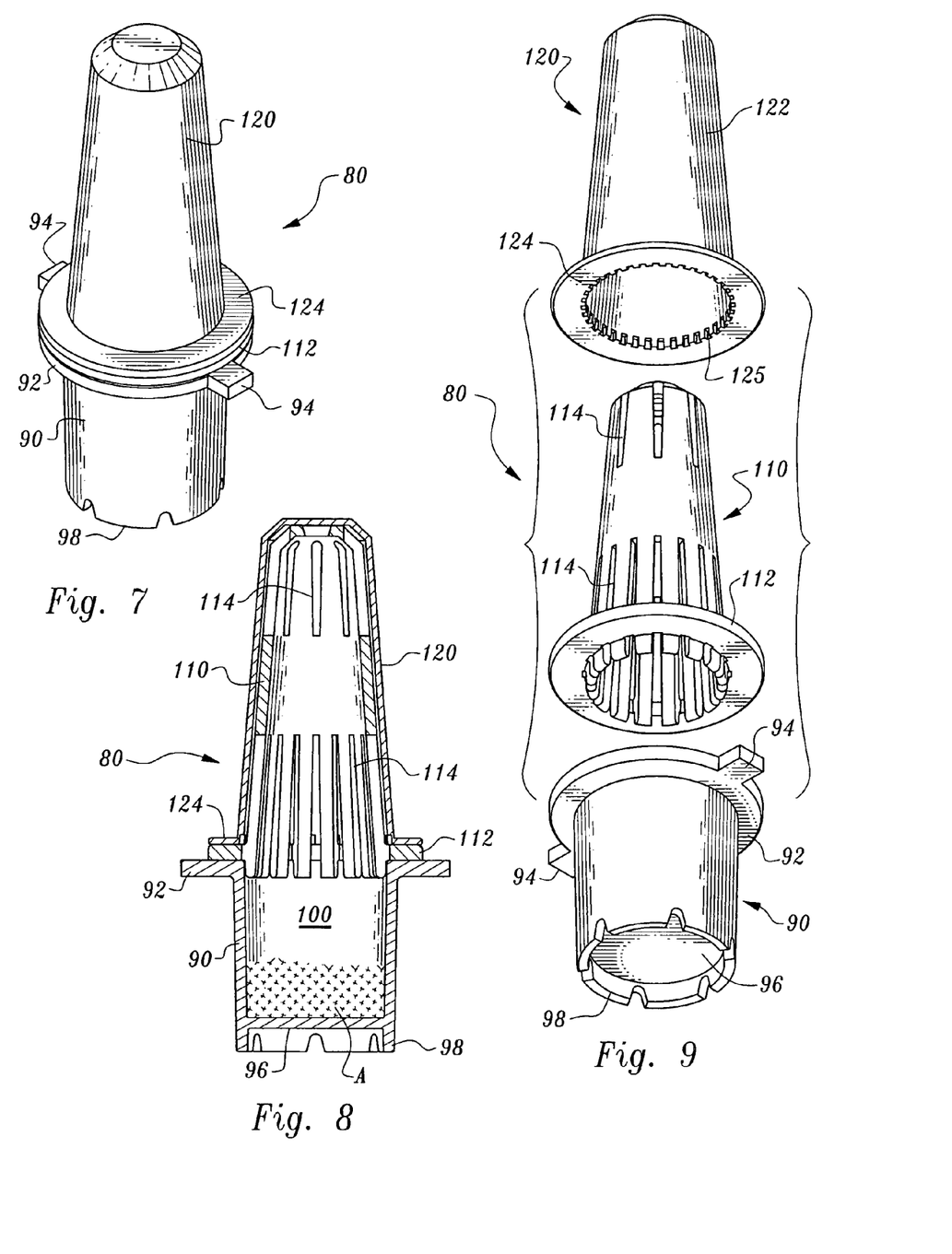
FIG. 7 is a perspective view of an attractant cartridge for use with the trap of this invention to refresh attractant used with the trap, and with a cover provided to seal the attractant within the cartridge before use.
FIG. 8 is a full sectional view of that which is shown in FIG. 7.
FIG. 9 is an exploded parts view of that which is shown in FIG. 7 and generally illustrating how the cap can be removed from other portions of the cartridge when the cartridge is ready for use.

The reservoir 100 defines a recess within the body 90 into which the attractant A can be placed. This reservoir 100 is preferably substantially cylindrical and is sufficiently large to contain an amount of attractant A required for the desired life of the cartridge 80. The attractant A can be recharged either by replacing the entire cartridge 80, or by merely placing additional attractant A within the reservoir 100 when original attractant A becomes depleted.

The upper shell 110 is preferably provided overlying the reservoir 100. The upper shell 110 includes a brim 112 which is fixed to the lip 92 and secures the upper shell 110 to the body 90. Fenestrations 114 are provided in the upper shell 110 so that air and attractant A vapors can pass out of the cartridge 80 and into the first chamber within the outer enclosure of the trap 10. These fenestrations 114 are preferably sufficiently small that they preclude yellowjackets Y from coming into contact with the attractant A. The upper shell 110 can have any of a variety of different forms. Most preferably, the upper shell 110 is somewhat tall to maximize a surface area through which the attractant A can be released.

The cartridge 80 is preferably originally provided with a cap 120 overlying the upper shell 110. This cap 120 includes a covering surface 122 which seals off the fenestrations 114 in the upper shell 110. The cap 120 includes an annulus 124 which is oriented generally adjacent the brim 112 and lip 92. Perforations 125 or some other zone of weakness preferably provides a means to separate the covering surface 122 from the annulus 124. The annulus 124 is preferably securely affixed to the brim 112 so that the covering surface 122 of the cap 120 can be removed when desired. Alternatively, the cap 120 can be attached to the cartridge 80 with temporary adhesive or some other removable attachment means.

In particular, the cartridge 80 is initially stored with the attractant A therein and with the cap 120 in place, so that the attractant A is not depleted until ready for use. When the cap 120 is removed, airflow through the upper shell 110 and into the reservoir 100 causes the attractant A to form a vapor which is dispersed out of the cartridge 80 into the first chamber within the outer enclosure of the trap 10. These vapors and the associated aroma can then migrate out of the entry holes 40 and into a surrounding environment around the trap 10. When the attractant A has become depleted, the cartridge 80 can be removed and replaced with a fresh cartridge 80.

In use and operation, and with particular reference to FIGS. 2 and 10, details of the operation of the trap 10 of this invention, according to the preferred embodiment, are described. Initially, a site is selected where yellowjackets Y or other flying insects are to be captured. This site can be an underlying support surface with the trap 10 resting upon the legs 30, or can utilize the eyelet 62 so that the trap 10 is suspended in midair. A cartridge 80 is then selected with an appropriate attractant A to draw the yellowjackets Y to the trap 10. The cap 120 is removed from the cartridge 80 and the cartridge 80 is inserted in to the port 82 as described in detail above. The attractant A disperses out of the entry holes 40 and into an environment surrounding the trap 10, with a gradient of attractant A intensity drawing the yellowjackets Y to the trap 10. Also, the trap 10 is preferably provided with bright colors and an otherwise visually attractive appearance to be visually attractive to the yellowjacket Y.

The yellowjacket Y preferably utilizes both visual senses and olfactory senses to be drawn to the entry holes 40 of the trap 10. As the yellowjacket Y passes through the entry holes 40 and into the first chamber within the outer enclosure of the trap 10, the yellowjackets Y are not as readily able to pass out of this first chamber, due to the configuration of the tunnel 46 adjacent the entry holes 40.

As the yellowjackets Y enjoy the smell of the attractant A within the first chamber, the yellowjackets Y will typically crawl around on the inner surface of the funnel 70 until they decide to leave. The logical path for leaving is through the opening 79. As the yellowjackets Y pass through the opening 79 and into the second chamber, the yellowjackets Y have an exceptionally difficult time in passing back through the opening 79, and thus remain trapped within the second chamber on the outer side of the funnel 70.

If the trap 10 becomes full of trapped yellowjackets Y, the user can cover the entry holes 40 and allow the yellowjackets Y to die, or otherwise take the trap 10 to a location where the yellowjackets Y can be safely released or disposed of in other ways. To release the captured yellowjackets Y, the trap 10 is typically inverted and the top cap 60 removed with the yellowjackets Y remaining within the top cap 60, generally in the form of a cup. The top cap 60 can then be dumped of the yellowjackets Y and reattached to the trap 10. The trap 10 is now ready to catch additional yellowjackets Y. When the attractant A becomes depleted over time, the trap 10 can be recharged by removing the cartridge 80 and replacing it with another cartridge 80 having fresh attractant A therein.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A rechargeable trap for capturing pests, comprising in combination:

an outer enclosure;

a funnel within said enclosure, said funnel dividing an interior of said enclosure into at least a first chamber on an inner side of said funnel and a second chamber on an outer side of said funnel;

said funnel having an opening at a tip, said opening adapted to allow pests to pass therethrough from said inner side of said funnel to said outer side of said funnel;

at least one entry hole into said first chamber within said enclosure, said at least one entry hole adapted to allow pests to enter said enclosure;

a cartridge filled with a pest attractant;

said cartridge formed separately from said enclosure and separately from said at least one entry hole;

wherein said cartridge includes an elongate upper shell taller than it is wide and extending down to a body below said elongate upper shell;

said body and said elongate upper shell permanently sealed together to preclude access to a reservoir within said cartridge for containing said pest attractant;

said upper shell including fenestrations therein, said fenestrations adapted to allow air to access said attractant within said reservoir and circulate into said enclosure;

said enclosure including a port adapted to removably receive said cartridge therein;

said port located below said opening at said tip of said funnel, such that said cartridge does not fill any portion of said opening in said tip of said funnel, and remains entirely below said opening when said cartridge is received within said port, and wherein said cartridge includes a lip extending radially from said cartridge, said lip surrounding said cartridge, said cartridge including at least one tab extending radially from said lip a distance further than said lip, said port having a radial extent greater than a radial extent of said lip of said cartridge and less than a radial extent of said tab, said port including a slot therein at least as large as said tab, such that said cartridge can pass through said port when said tab is aligned with said slot.

\* \* \* \* \*